United States Patent [19]
Cantu et al.

[11] Patent Number: 5,125,427
[45] Date of Patent: Jun. 30, 1992

[54] FREEZE-THAW METHOD FOR TEMPORARILY PLUGGING PROCESS FLOWLINE

[75] Inventors: Lisa A. Cantu, Ponca City, Okla.; Allen R. Petree, Casper, Wyo.

[73] Assignee: Conoco Inc., Ponca City, Okla.

[21] Appl. No.: 679,410

[22] Filed: Apr. 2, 1991

[51] Int. Cl.⁵ .............................................. F17D 3/00
[52] U.S. Cl. ...................................... 137/13; 137/334
[58] Field of Search ......................... 137/13, 828, 334; 62/66; 138/89, 97; 166/294, 197

[56] References Cited

U.S. PATENT DOCUMENTS

| | | |
|---|---|---|
| 3,631,870 | 1/1972 | Livingston ........................ 137/13 X |
| 4,370,862 | 2/1983 | Brister ............................. 137/130 X |
| 4,396,031 | 8/1983 | Peterson ............................... 137/13 |
| 4,416,118 | 11/1983 | Brister ..................................... 62/66 |
| 4,492,095 | 1/1985 | Brister ................................... 137/13 |

*Primary Examiner*—Alan Cohan
*Attorney, Agent, or Firm*—Richard W. Collins

[57] ABSTRACT

Temporary plugs are formed in process flowlines by injecting into the flowlines a plugging material having a freezing point only slightly below the ambient temperature. The plugging material is frozen in place, and a servicing operation is conducted on the flowline. The plugging material is then allowed to thaw or is thawed by applied heat. Linear primary alcohols and normal paraffinic hydrocarbons are preferred plugging materials.

7 Claims, No Drawings

FREEZE-THAW METHOD FOR TEMPORARILY PLUGGING PROCESS FLOWLINE

BACKGROUND OF THE INVENTION

1. Field Of The Invention

This invention relates to servicing of process flowlines, and more particularly to methods for forming temporary plugs in process flowlines so that servicing operations on the flowlines can be conducted. A specific embodiment of the invention relates to a method for forming a temporary plug in one of a plurality of well production flowlines extending from a plurality of wells to a common processing unit. For example, flowlines from a plurality of offshore wells typically extend to a platform-mounted separator, and occasionally one of the flowlines requires servicing, such as replacement of a leaking valve or repair of a section of the flowline It is desirable to keep the other wells on production when a particular well flowline needs servicing, and the present invention provides an improved method of accomplishing that goal.

2 The Prior Art

It is common practice to isolate a section of a process flowline for purposes of servicing the flowline. This is preferably done by closing valves on the flowline on both sides of the point requiring service. However, very often servicing is required where valves are not available for isolating the pertinent part of the flowline. In such cases, temporary plugs have been formed by injecting water into the flowline at a point to be plugged, and then freezing the water in place. This technique has been used with some success in the past, but is subject to certain problems In areas of high ambient temperature, an excessive amount of cooling is required to form the plug. For example, many hours or even days are required to form a plug of frozen water in large diameter lines at ambient temperatures of 20° C. or more. Also, the expansion properties of water upon freezing can cause damage to the flowline.

U.S. Pat. Nos. 3,827,282; 4,112,706; 4,220,012; 4,370,862 and 4,416,118 to Brister all describe means for freezing a water plug in a fluid transmission line.

U.S. Pat. No. 3,623,337 to Tremont describes an apparatus for freezing liquid in a section of pipe.

U.S. Pat. No. 4,383,783 to Kraka et al., and U.S. Pat. No. 4,379,722 to Scott disclose use of a moveable gel plug during construction of an offshore pipeline.

U.S. Pat. No. 4,739,799 to Carney et al. discloses a frangible and soluble plug for temporarily blocking a sewer pipe.

The prior art discussed above has not dealt with the problem of repairing a process flowline in high ambient temperature conditions with a plug formed of a material having a freezing point higher than the freezing point of water.

SUMMARY OF THE INVENTION

According to the present invention, a method is provided for forming a temporary plug in a process flowline, the plugging material having a freezing point not greatly below the ambient temperature around the flowline. A slug of the plugging material is injected in liquid form into the flowline and then frozen in place to temporarily seal off flow through the flowline while a servicing operation is performed on the flowline. After the servicing operation is completed, the plug is allowed to thaw, or is thawed by applied heat, and the flowline is returned to service.

Linear primary alcohols and linear paraffinic hydrocarbons having freezing points from 10° to 20° C. below the ambient temperature are the preferred plugging materials.

DESCRIPTION OF THE PREFERRED EMBODIMENTS

This invention is applicable to servicing of process flowlines in general, but will be described as it would apply to servicing of an oil well production flowline, as it has particular utility in that context, especially in warmer or summer temperature conditions. Offshore petroleum production operations in the Gulf of Mexico are often carried out at ambient temperatures of from 30° to 35° C. At these temperatures, it is very difficult to plug a process flowline by freezing water which has been injected into the flowline. Especially when large diameter flowlines are involved, it may take many hours or even days to close off a flowline by freezing water in the flowline.

According to a preferred embodiment of this invention, the plugging material is an organic material liquid at ambient conditions and selected from the group of linear primary alcohols and normal paraffins (waxes) having suitable melting-freezing points. For example, undecyl alcohol has a melting point of 19° C., and pentadecane has a melting point of 10° C. In most cases, a plugging material having a melting point within about 10° to 15° C. of the ambient temperature is preferred, taking into account that the ambient temperature will normally vary with time. Ideally, the plugging material will be compatible with the material in the flowline, such that separation of the plugging material is not necessary after the plug has thawed. In this regard, normal paraffins are compatible with crude oil and with some refined petroleum products.

The plugging material in the flowline can be "frozen" by refrigerating the flowline. This can be done by, for example, passing cooling fluid directly or indirectly over the section to be plugged, using apparatus such as is described in the above-noted patents. Another way of solidifying the plugging material is by packing dry ice around the section to be plugged.

In some cases, such as in servicing a flowline that has long runs between valves, and where a valve or other fitting in the line needs servicing, a plug can be formed on both sides of the valve or fitting. The valve can then be serviced or replaced, the plugs thawed, and the line returned to service.

This invention is particularly useful in cases where a well production line extending to a treating facility on an offshore platform is involved, and especially at ambient conditions of 20° or higher.

We claim:

1. A method for temporarily plugging a process flowline, the method comprising:
   (a) injecting a liquified plugging agent selected from the group consisting of linear primary alcohols and normal paraffinic hydrocarbons, said agent having a freezing point below the ambient temperature around said flowline, into said flowline in direct contact with the interior surface of said flowline at a location to be plugged;
   (b) removing sufficient heat from said plugging agent to freeze said plugging agent in said flowline;

(c) performing a service operation on said flowline; and (d) thawing said plugging agent and returning aid flowline to service.

2. The method of claim 1 wherein said plugging agent is undecyl alcohol.

3. The method of claim 1 wherein said plugging agent is heptadecane.

4. The method of claim 1 wherein said ambient temperature is at least 20° C.

5. The method of claim 1 wherein said plugging agent has a freezing point of from 10° to 15° C. below said ambient temperature around said flowline.

6. The method of claim 1 wherein said flowline is one of a plurality of well production flowlines extending from a plurality of wells to a common processing unit.

7. The method of claim 1 wherein said flowline is a well production flowline extending to a treating facility on an offshore platform.

* * * * *